United States Patent [19]

Taylor

[11] 3,971,839

[45] July 27, 1976

[54] PARTICLE FILLED SELF-CONFORMABLE CUSHION AND METHOD OF MAKING SAME

[76] Inventor: Don A. Taylor, Box 4, Wadsworth, Ohio 44281

[22] Filed: Dec. 6, 1971

[21] Appl. No.: 204,972

[52] U.S. Cl. ............................. 264/112; 264/126; 264/248
[51] Int. Cl.² ...................... D04H 1/54; B29C 6/02
[58] Field of Search ........... 264/109, 112, 113, 126, 264/248, 122

[56] References Cited
UNITED STATES PATENTS

| | | | |
|---|---|---|---|
| 2,878,153 | 3/1959 | Hacklander | 264/248 |
| 3,048,537 | 8/1962 | Pall et al. | 264/126 X |
| 3,244,783 | 4/1966 | Eissfeldt et al. | 264/112 |

OTHER PUBLICATIONS
Chemical Engineering, vol. 69, June 11, 1962, p. 207.

*Primary Examiner*—Robert F. White
*Assistant Examiner*—Thomas P. Pavelko

[57] ABSTRACT

A quantity of discrete particles of thermo-meltable material are heated to melt those particles at the surface of the charge for a predetermined distance inwardly of the charge. The particles remote from the surface of the charge remain in original and unmelted condition. While the melted particles are in a melted condition molding pressure is applied to the exterior of the charge to shape the melted material into a covering encapsulating, at least in part, the unmelted particles. In a further embodiment the particles remote from the surface of the charge may under heat and pressure be superficially tacked together.

9 Claims, 18 Drawing Figures

INVENTOR.
Don A. Taylor,
BY John H. Leonard,
his attorney.

U.S. Patent  July 27, 1976  Sheet 3 of 4  3,971,839
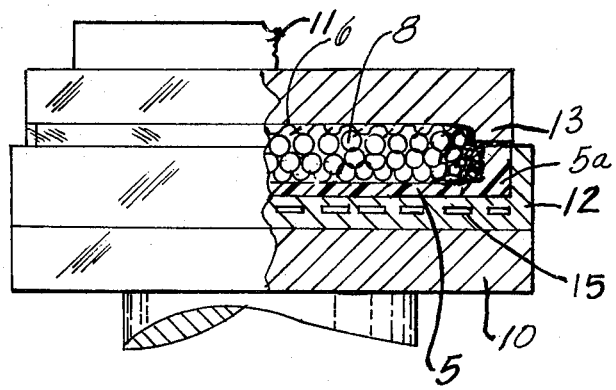
Fig. 9
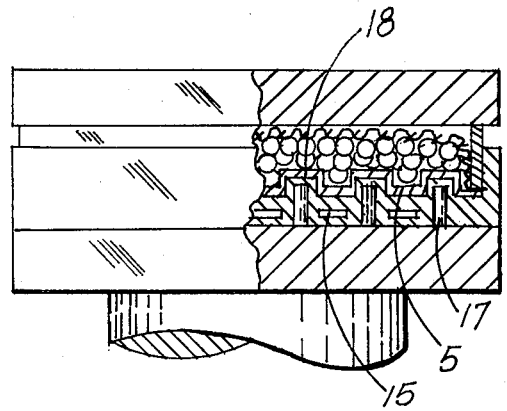
Fig. 10
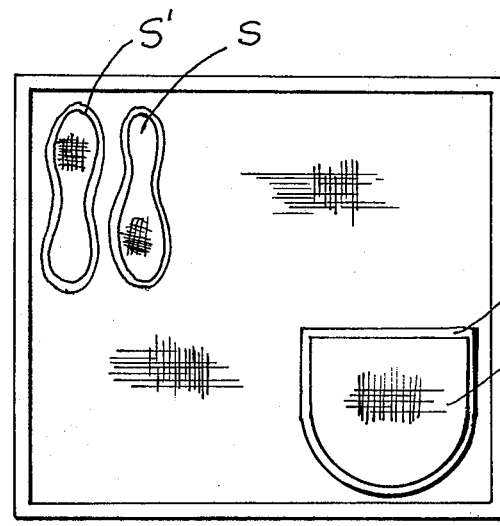
Fig. 11
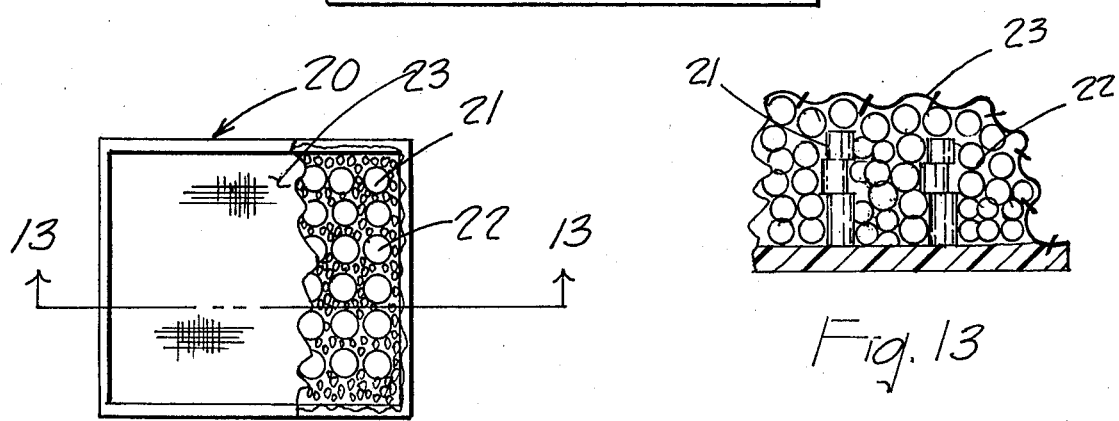
Fig. 12
Fig. 13
INVENTOR.
Don A. Taylor,
BY John H. Leonard,
his attorney.

INVENTOR.
Don A. Taylor,
BY John H. Leonard
his attorney.

PARTICLE FILLED SELF-CONFORMABLE CUSHION AND METHOD OF MAKING SAME

BACKGROUND OF INVENTION

1. Field of Invention

Fabricated cushioning material in which a filler of discrete particles are encapsulated in loose condition in a confining envelope.

2. Description of Prior Art

Pads, mattresses and cushions stuffed or filled with loosely packed discrete particles so that they conform to the contour of the engaged portion of a body or article supported thereby are known in the art. Generally these cushions or mattresses are, in turn, supported on a supporting structure such as springs or a chair seat which may be rigid or elastic. As a pad, the material may be used as a splint and wound about or otherwise held against an injured part of the body. The case is of gauzelike woven fabric and only 80 to 90% filled with particles. Such a structure is disclosed in U.S. Pat. No. 3,459,179, Aug. 5, 1969 entitled "Supporting Pad with Massaging Means." A great amount of handwork is required to fabricate such cushioning material, with the result that they are very expensive.

Sometimes resilient particles, such as soft rubber or sponge rubber, are used and dispersed through a mass of fibre stuffing within the mattress or cushion, one of the earlier examples of this combination being U.S. Pat. No. 74,340 issued in 1868, and showing cushions stuffed with fibre and hollow elastic blocks or globules.

The present invention is directed primarily to a unitary cushioning structure, self-conformable to the contour of the surface of an object pressed thereagainst, in which a quantity of discrete particles is encapsulated in a flexible, tear resistant, cover or casing so as to completely fill the casing. If a relatively rigid supporting structure is to be used in connection with the cushioning structure, it may be integral therewith. If a flexible or resilient supporting structure is to be used in connection with the cushioning structure, as for example in the case of shoe soles, the integral base may be flexible or resilient. More particularly, the invention is directed to a method of molding the unitary cushioning structure by the application of controlled heat and pressure to a charge comprising globular particles or beads of raw thermoplastic or thermosetting material, each of which is hereinafter referred to as thermo-meltable material.

The thermo-meltable particles used are relatively inexpensive and the method of manufacture is simple and requires little or no hand labor, so that the manufacturing cost is low, making the structure practical commercially for many fields of use in which heretofore it was unduly expensive. The unitary molded structure is free from extraneous connecting or fastening means, and lends itself to use as a base material for forming many specific articles by simple combined cutting and heating steps applied to localized areas of the structure.

Various other objects and advantages will become apparent from the following description in which reference is made to the drawing.

BRIEF DESCRIPTION OF THE DRAWING

FIG. 9 is an enlarged cross sectional view illustrating the method of molding the structure illustrated in FIG. 1;

FIG. 10 is a view similar to FIG. 9 illustrating the method of molding a modified form of the structure;

FIG. 11 is an enlarged top plan view of the cushion structure illustrating its use as a base material and the manner in which specific articles are formed therefrom;

FIG. 12 is a fragmentary top plan view illustrating a modified form of the cushion;

FIG. 13 is a fragmentary cross sectional view taken on the line 13—13 in FIG. 12;

Figure 1:
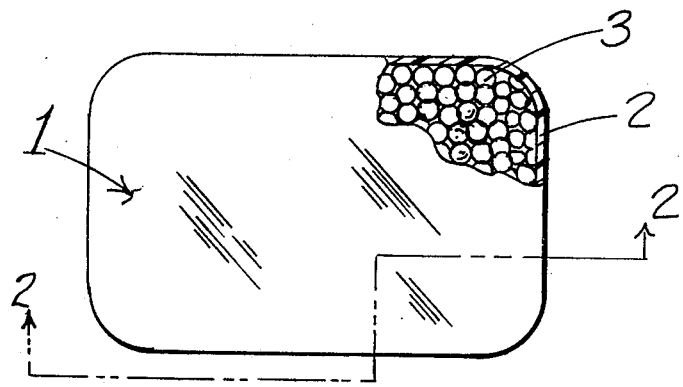
FIG. 1 is a top plan view of a cushion or pad of the cushioning structure of the present invention, part of the casing of the structure being broken away for clearness in illustration.
Figure 2:
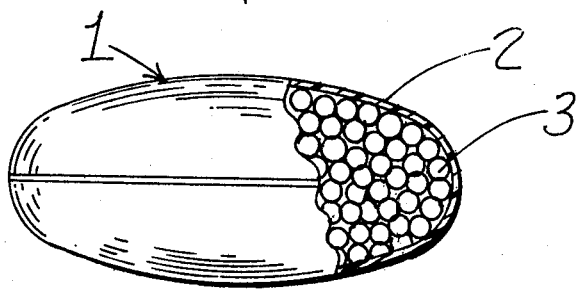
FIG. 2 is a cross sectional view of the cushion illustrated in FIG. 1, and is taken on the line 2—2 thereof.

Referring to the drawing, the structure and the method of making the same are shown and described as applied to a cushion which is self-conforming to the contour of a surface or object resting thereon, the cushion being molded originally for use as a cushion or as a basic cushioning structure used as the raw material for fabricating other articles.

In its broadest concept, the invention contemplates the formation of a cushioning structure comprising a flexible, tough, tear resistant casing or cover filled with small discrete, preferably globular, particles of thermo-meltable material in which the particles are in loosely packed condition relative to each other, but are tightly confined as a group, the encapsulating case or covering as a whole, or in part, being formed of the same material as the particles. Such a structure is illustrated in FIG. 1 and as there shown is embodied in a cushion 1 having a unitary encapsulating covering or case 2 which encloses the discrete filling particles 3 in the loosely packed, but tightly confined condition.

The cushion is formed by introducing into a confined space, such as a heating compression mold cavity, a charge of the thermo-meltable particles 3 in raw condition. The particles 3 are of small size and preferably globular, though the particles may be heterogeneous as to size and shape.

While confined in the mold cavity and subjected to molding pressure by the mold parts, the charge is heated by heating means within the mold so as to melt the particles at all or selected portions of the surface of the charge and so they become plastic and readily flowable. While in this condition, and while maintaining the pressure, the mold is fully closed and held closed for a preselected time and heat cycle, to form of the outer molten particles a flexible, tough, tear resistant skin of preselected thickness, depending upon the time and intensity of the heat applied. The resultant molded product, if of thermoplastic material, is allowed to cool and set, the skin becoming a flexible unitary permanent covering or casing enclosing the unheated, uncured particles which remain tightly confined therein in loose condition relative to each other. In the case of thermosetting material, the heating is continued until the material is set.

Figure 3:
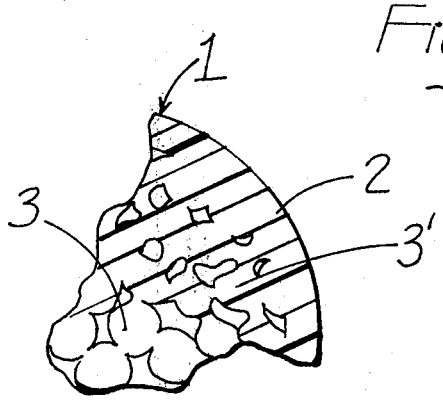
FIG. 3 is an enlarged fragment of the sectional view illustrated in FIG. 2, showing in greater detail the condition and interrelation of the discrete particles.

As shown in FIG. 3, some of the particles 3, near the casing, as indicated at 3', may be partially plasticized by the heat and slightly deformed and superficially tacked together, so that the skin has an inner surface stratum which outwardly merges with the solid portion of the casing proper and inwardly merges with the adjacent stratum of the loose raw particles. The superficially tacked particles are movable relative to each other with somewhat of a spring action due to the interconnecting flexible integuments connecting them together.

Figure 4:
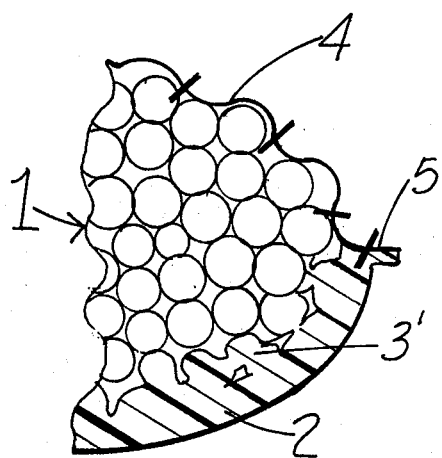
FIG. 4 is a fragmentary cross sectional view similar to FIG. 2 and disclosing another modification of the invention.
Figure 5:
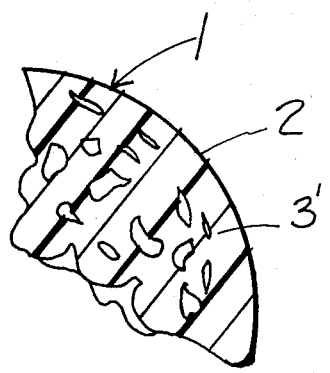
FIG. 5 is a fragmentary cross sectional view similar to FIG. 2 showing a modified form of the cushioning structure.

If desired, the heating can be selected so that all of the particles of the charge are superficially flexibly tacked together as indicated in FIG. 4.

It is preferable, however, that the greater portion of the particles remain in their raw condition and unconnected in any way to each other so they can shift their positions relative to each other to permit the cushioning to conform to the contour of the engaged surface resting upon it.

The depth of penetration and relation of melted, to plasticized, to raw particles is controlled by selected combinations of the intensity of the applied heat and the length of the period of application. Generally, for deep penetration and a thick cover, a lower temperature and longer time are employed. For shallow penetration, as when a thin skin is desired, a higher temperature and shorter period of application are used.

If desired, for decorative effects a partial or localized covering 4 of fabric or selected woven material, such as decorative upholstery material, may be laid over the charge when it is placed in the mold so that in the molding operation the fabric cover 4 is bonded along its entire peripheral margin 5 to the portion of the cover 2 formed by melting and setting of the outer stratum of the particles.

In this particular form, all of the particles 3, except for a very narrow band of particles 3', partially distorted and tacked together by heat adjacent the plastic material portion of the cover 2 remain loosely packed in relation to each other, but closely confined.

The skin or covering thus formed by melting the outer particles is usually thicker than the skin customarily occurring on foamed rubber articles and the like as an incident to the molding operation thereof. The skin or covering formed of the thermoplastic material in the present case is made deliberately thicker than such incidental skins and tough and tear resistant, so that it is strong and durable, though flexible. This is done by the controlled heating and positive melting of the outer strata of particles. This is desirable and necessary so that the cover or casing is strong enough to retain the loose particles enclosed therewithin tightly confined. If desired, the thermo-meltable material may be selected so that, when melted and set, it remains somewhat elastic and self-restoring to its original shape.

Figure 6:
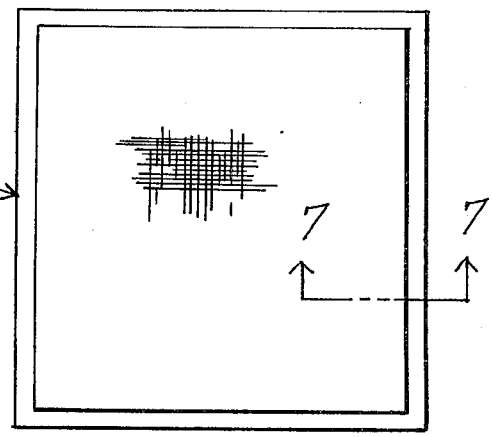
FIG. 6 is a top plan view of another cushion structure embodying the principles of the present invention.
Figure 7:
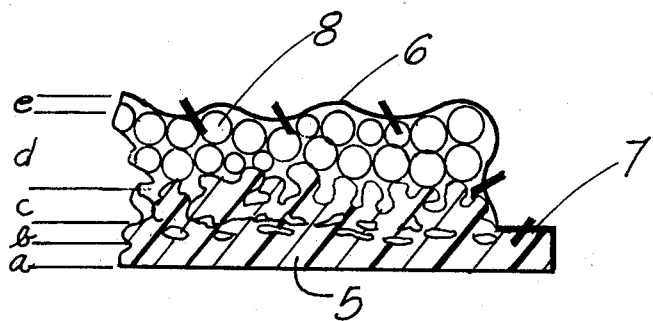
FIG. 7 is an enlarged cross sectional view of the structure illustrated in FIG. 6 and is taken on line 7—7 thereof.

Referring next to FIGS. 6 and 7, a cushioning structure having a relatively stiff integral base and cover is illustrated. This structure comprises a solid base 5 and a cover indicated at 6. The cover 6 may be plastic and integral with the base 5, as above described, but is shown in FIGS. 6 and 7 as woven fabric upholstery material bonded by its peripheral margin 7 to the base 5 by the penetration of the plastic material of the base 5. The space between the base 5 and the cover 6 is filled with discrete particles, indicated at 8, which are of such size, shape and quantity that they are loosely packed in the space between the base 5 and cover 6, but are tightly confined thereby. The base 5, if the structure is to be used as a chair seat, is sufficiently thick and rigid to support a load while it itself is supported at the rim or corners. If the structure is to be supported over its underface, the base 5 may be relatively thin and somewhat flexible, in which case it can be supported on its under side to the degree necessary to afford the rigidity desired.

The discrete particles 8 may be variegated in size and in shape, and preferably are regular geometric shapes or globular, and of relatively uniform size. They preferably range from about powder particle size to about one fourth inch in diameter, but may exceed this upper limit. They may be relatively rigid or resilient. Specifically, particles of regular geometric shape, particularly spherical shape, are preferred. The base 5 and discrete particles 8 are composed of thermo-moldable material, including the well known synthetic plastics and moldable rubber compositions. Those preferred soften beginning at about 250° to 400° F., depending upon the thermo-moldable material used. The material may be, for example, polyethylene, polyvinylchloride, styrene, rubber, or other thermo-moldable material, in a raw state.

Figure 8:
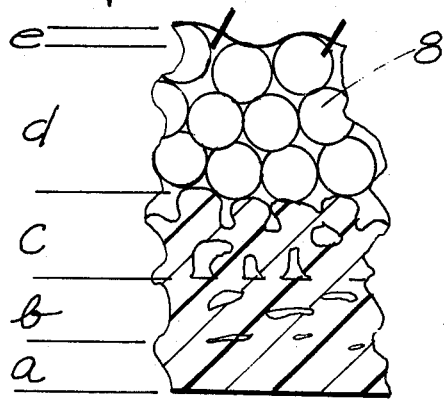
FIG. 8 is a further enlarged fragmentary cross sectional view of the cushion structure illustrating the various strata of the structure.

As best illustrated in FIGS. 6 through 8, the cushioning structure comprises a plurality of superposed strata $a$ through $e$, respectively, which, at their adjacent faces, tend to interpenetrate each other and coalesce so that they merge into one another without sharply or precisely defined planes of demarcation. The base 5 is relatively solid, the result of the particles in the lower strata $a$ having been fully melted and set. Superposed on the base 5 is stratum $b$ in which the particles have not been fully melted, but the resultant stratum is relatively solid. Superposed on the stratum $b$ is a stratum $c$ in which the particles have been only slightly plasticized, with the result that the particles therein are distorted slightly and only superficially tacked together by integral integuments of a weblike configuration so that they have a spring-like or hinge-like action permitting the tacked particles to move relative to each other. The discrete particles thereabove in the much thicker stratum $d$ remain in their original raw condition.

The extremely low cost of the present cushioning structure as compared to prior structures, and the cost which makes it applicable for many installations and items in which the cost of prior structures would render their use prohibitive becomes apparent from the method by which this present structure is manufactured.

The method combines the use of relatively conventional compression molding equipment and properly selected starting material, and selective heating as a result of which the cushion structure in various shapes and forms with various degrees of cushioning can be formed readily. As best illustrated in FIG. 9, a cushioning structure is shown as formed in a conventional press having a movable platen 10 and a stationary platen 11 and conventional pressure mold members including a female mold member 12 having an upwardly open cavity and a companion male mold member 13. The female member 12 may include conventional heating elements, such as indicated at 15, these being arranged in the mold and operated selectively, depending upon the various heating effects required for the finished product.

In the form of the invention illustrated in FIG. 9, the cushion structure is one in which the base is reinforced by relatively heavy integral side walls 5a, but it may be made flat, as in FIG. 7, if desired.

In this form, the cavity of the member 12 is filled with the required loose charge of raw, uncured thermoplastic beads 8 of the diameter desired, as indicated by the particular uses to which the finished article is to be put, and the cover 6 is laid thereon. Thereupon the heating elements 15, which may be conventional electrical or steam heating elements, are rendered active so as to heat the thermo-meltable material in the mold cavity. Heating is carried on selectively, depending upon the degree of melt required in the particular particles at selected locations. Concurrently with the heating and melting, the mold members 12 and 13 are closed to apply pressure. The cover 6 is pressed down firmly over the charge by the mold member 13 and its margins are firmly bonded to the base 5 by interpenetration of the cover 6 by the plasticized material forming the base 5.

The heating and pressure are maintained until the desired interpenetration of heat from the bottom upwardly into the mass of particles 5 is obtained. By proper control of this heat, the particles at the bottom of the charge are completely melted and plasticized to form the homogeneous solid base 5 which may be rigid or flexible. The particles themselves cause the heat applied to the bottom of the charge to penetrate upwardly progressively as the temperature increases or as the period of heating is increased.

By this very simple method of molding, the thickness of the base 5 and walls 5a, and of the various intermediate strata and of the top strata can be accurately controlled. Since the margins of the cover 6 are bonded to the base by interpenetration of the material of the base, a complete and substantially unitary structure is obtained as a result of a single molding operation. Upon completion of the molding cycle, the molded contents are discharged from the mold and are ready for use.

In instances where the article is to be formed directly in the shape in which it is to be used, either thermoplastic or thermosetting material may be used. Also, it may be desirable to make the base with dependent ribs or flanges for reinforcing it, as illustrated in FIG. 10. In such a case, not only are the basic heating elements, such as 15, provided, but also supplemental heating elements, as indicated at 17, are employed at the positions desired for plasticizing the material to form relatively deep depending ribs 18 on the base 5 while leaving the upper base portion relatively thin and with its upper surface relatively flat.

In FIG. 11, a cushioning structure such as illustrated in FIGS. 6 and 7, is shown as made in longer length and width so as to be adapted for use as a base material for forming other articles; for example, a seat cushion C and shoe soles S. In such a case, thermoplastic material must be used, as it is necessary that it be subsequently remelted at selected areas to form the articles desired. The articles are formed from the slab or sheet by a suitable cutting and heating die by which the shape of the sole or seat is defined by heat applied to its margin C' or S' to remelt the particles at the margins and press them against the already formed and set base so as to bond the margins of the article to be cut out from the structure to the base in sealing relation. When so bonded, the cutting blade descends and cuts out the article at the outer limits of the margin leaving the portion within the margin substantially unchanged.

Referring next to FIGS. 12 and 13, a modified form of cushioning structure 20 is employed. The structure 20 is essentially the same as the structure illustrated in FIGS. 1 and 9, except that a spring action is obtained by a plurality of upright rows of thermo-meltable tubes 21. The tubes are arranged in end to end relation and offset from coaxial relation with respect to each other. These tubes 21 of each row, due to the heating effects, are tacked together slightly at their end and afford some rigidity while at the same time they can buckle readily resiliently. Due to their lateral resilient buckling, spring action is provided. The discrete particulate particles, indicated at 22, are loose and unconnected to each other and extend above with the upper ends of the rows of the short tubes 21. The cover 23 may be fabric, or plastic sheet, integral with the base.

Figure 14:
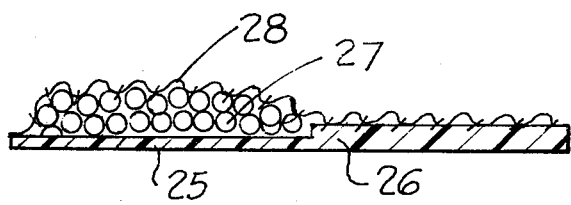
FIG. 14 is a cross sectional view of another modification of the cushion which can be obtained by the molding operation.

Referring next to FIG. 14, a cushioning glove, for instance, a bowling glove or other glove which is to conform and cushion against the surface of an object to be grasped, is illustrated. In this form, the structure has the base 25 with a thickened portion 26. The normal base has a superposed layer of raw thermo-plastic pellets 27 held in place in loosely packed, but highly confined condition, by a surface layer or covering 28. In this form, the heating is applied so as to melt completely the charge of particles at one end of the mold which is to form the portion 26 and partially melt only the under strata of the charge of particles overlying the thinner portion of the base 25.

Figure 15:
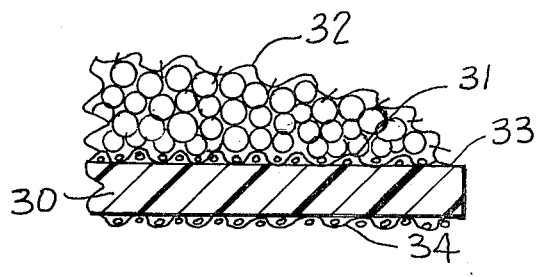
FIG. 15 is a cross sectional view illustrating a reinforced form of the cushioning structure.

In FIG. 15, a structure similar to FIG. 1 is shown in which the base 30 is overlaid with a layer 31 of reinforcing fabric composed of wire or woven mesh, or other material. The layer 31 is bonded to the base over its entire area. The cover 32 of the structure is bonded to the base marginally, as indicated at 33. If desired, a layer 34 of like or other material is bonded, or embedded in the base of the entire area of the layer at the face opposite the layer 31, as illustrated.

Figure 16:
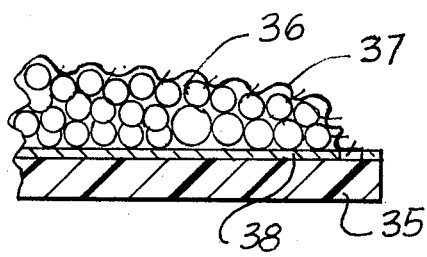
FIG. 16 is a fragmentary cross sectional view illustrating a further modification of the method.

Referring to FIG. 16, a cushioning structure similar to that of FIG. 1 is shown with a base 35, similar to the base 5, supporting the discrete particles 36 and covered by a cover 37, such as the integral plastic or separate fabric or sheet, heretofore described. During the formation, an interposed element 38 is disposed within the charge below the level of the particles which are to be left intact and uncured. The element 38 may be a reinforcing metal sheet which has the additional advantage that the molding pressure is transferred to the lower stratum more uniformly. The element 38 may be a material having low heat conducting properties, and used so as to control the depth of heat penetration and provide a sharper line of demarcation between the plasticized and molded base 35 and the discrete particles 36.

Figure 17:
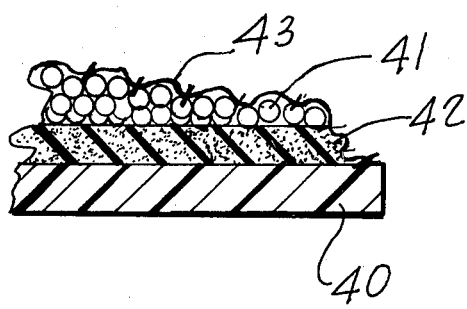
FIG. 17 is a fragmentary cross sectional view illustrating a modification in which a heat insulating barrier is incorporated.

A modification is illustrated in FIG. 17 in which between the layer of particles to form the base 40 and the discrete loose particles 41, a sheet 42 of foamed, closed or open-celled, rubber or other plastic material is interposed in the charge. The foamed sheet material bonds with the molten plastic which forms the base 40. The structure is provided with a cover 43, such as heretofore described.

Figure 18:
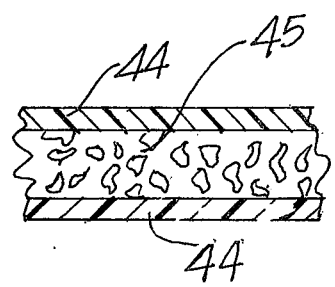
FIG. 18 is a fragmentary cross sectional view illustrating a modification of the invention in which all of the particles are bonded or tacked together.

In some instances it may be desirable to eliminate the free loosely packed particles. As illustrated in FIG. 18, the structure may comprise a solid base 44 resulting from molding of the melted material and having adherent thereto strata 45 of particles, all of which have been partially plasticized and subjected to pressure so that they are distorted and bonded and tacked together, those nearest the base being more distorted and bonded than those farther from the base. Thus the particles have limited resiliently opposed movement relative to each other providing a cushioning and spring action, which, when combined with the resilient base, provide a self-conforming cushion structure.

It is apparent from the foregoing that a cushioning material used directly as a cushion or for fabrication of other articles can be provided economically by facilities and with the type of labor which are commonly available in plastic and rubber molding plants. The resulting material has distinct advantages in that it is well bonded into a unitary structure without the necessity for sewing and extraneous mechanical fastenings. It can be provided in range from high resilience to moderate or low resilience. It has good flexural strength and can have imparted to it preselected degrees of rigidity. The combination of these characteristics is selective and variable as desired to meet the specifications required for the final product. It is formed of materials which are readily available on the market in the form in which they are very inexpensive, such as uncured rubber particles or beads, or thermo-meltable powder and particles, sold to customers as raw material for manufacturing by the usual plastic compression die molding and extrusion processes customarily used by plastic article manufacturers.

Practically all products of manufacture have an acceptable preestablished dimension state required by the specific product. As an example, a shoe sole usually is one fourth of an inch, or 12 irons, in thickness, yet the required flexural ability limits severely the material suitable to this use, particularly most plastic materials. Invariably such soles are formed in a solid state which cannot withstand the necessary flexure without early failure. With the present material, the required dimensional requirements can be met yet the material, though solid, can withstand flexure effectively. It greatly increases the flexural strength and is self-conforming to the sole of the foot by virtue of the encapsulated discrete particles. A distinct advantage in manufacture is that the cushioning material or structure can be molded or composed in a very brief period of time lending itself to very high productivity, such as 2 minute cycles with an exposure at 400° and above Fahrenheit.

The granules, preferably small, may be heterogeneous in size and shape or of regular geometric shape, particularly globular or spherical. They must be raw or thermo-meltable material. Preferably they are resilient.

In some cases the base or lower stratum can be preformed or prefabricated material of a type to which the melted thermo-meltable material will bond. Generally, it may be load bearing so as to support a substantial weight within its marginal limits which is supported only at locations about its marginal limits.

The covering is, as mentioned, tough, flexible, and tear resistant. It can be elastic to assist in recovery and may be a woven fabric, leather or upholstery material, or a molded sheet of conventional plastic materials, and preferably is the latter, formed by melting and setting a surface stratum of the particles.

A large number of different articles can be formed simultaneously by molding initially or by cutting and bonding operations applied to a single cushioning structure, the article outlines being interfitted in such a manner that waste material is reduced to a minimum.

The structure has many advantages for use in orthopedic and athletic bracing devices which require support at one area and padding or cushioning at another.

Having thus described my invention, I claim:

1. A method of making a cushioning structure comprising:
    supporting in loosely packed condition in a confining space a charge of discrete particles which are composed of raw thermo-meltable material and which are in a size range upwardly from about powder size and to large enough so that each particle is readily distinguishable visually by the unaided eye as an individual particle separate and apart from the other particles;
    applying heat under controlled temperatures and time to the charge to melt those of the particles at the surface of the charge, and for a predetermined distance inwardly from the surface of the charge, at selected areas of the surface of the charge while limiting the heating so that the particles farther inwardly remain in their original and unmelted condition; and
    applying molding pressure to the exterior of the charge at said areas while said melted particles are in melted condition to shape the melted material into a covering encapsulating at least in part the unmelted particles.

2. The method according to claim 1 wherein the shape and thickness of covering formed of the material is controlled by the shape of the confining space, the heating pattern, the temperature, the pressure, and the duration of application of the applied heat.

3. The method according to claim 2 wherein a flexible sheet of material different from the material of the particles is laid onto one side of the charge;
    the surface of the charge at said one side is maintained at a temperature below melting temperature at the portion lying inwardly from the lateral margins of the charge which margins are relatively narrow; and
    the applied pressure is applied to the sheet overlying the margins of the charge to cause the margins of the sheet to become bonded to the material of the charge at said margins.

4. The method according to claim 1 wherein the charge is melted by heat which is applied principally at the bottom thereof and which is caused to penetrate upwardly to melt enough of the particles to a depth to provide a relatively thick base.

5. A method of making a cushioning structure comprising:

supporting in loosely packed condition in a confining space a charge of discrete particles which are composed of raw thermo-meltable material and which are in a size range upwardly from about powder size and to large enough so that each particle is readily distinguishable visually by the unaided eye as an individual particle separate and apart from the other particles;

applying heat under controlled temperature and time to melt those of the particles at the surface of the charge, and for a predetermined distance inwardly from the surface of the charge, at selected areas of the surface of the charge and limiting the heating so that the particles farther inwardly remain in unmelted condition; and applying pressure to the exterior of the charge at said areas while said particles are in melted condition to cause the melted material to form into a relatively solid base, and to cause a stratum of particles of the charge to be formed into a covering encapsulating the remainder of the charge and bonded to the particles adjacent to said covering, and to cause the other particles of the remainder of the charge to be superficially tacked together so that they can shift freely in their relative positions within a limited range only.

6. The method according to claim 1 wherein the particles are of regular geometric shape.

7. The method according to claim 1 wherein the particles are generally globular.

8. The method according to claim 1 wherein the heating and molding pressures are continued until said covering formed by melting is impervious throughout.

9. The method according to claim 1 wherein the heating and molding pressures are applied over the entire exterior surface of the charge and are continued until said covering is coextensive with the entire outer surface of the charge.

* * * * *